(12) United States Patent
Tseng et al.

(10) Patent No.: US 9,927,843 B1
(45) Date of Patent: Mar. 27, 2018

(54) ROTATION DEVICE

(71) Applicant: Cheng Uei Precision Industry Co., Ltd., New Taipei (TW)

(72) Inventors: Chi-Ming Tseng, New Taipei (TW); Chin-Chung Lin, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/623,308

(22) Filed: Jun. 14, 2017

(51) Int. Cl.
*G06F 1/16* (2006.01)
*H05K 7/00* (2006.01)

(52) U.S. Cl.
CPC .......... *G06F 1/1679* (2013.01); *G06F 1/1616* (2013.01); *G06F 1/1681* (2013.01)

(58) Field of Classification Search
CPC ........................................................ G06F 1/16
USPC ................................... 361/679.21
See application file for complete search history.

(56) References Cited

U.S. PATENT DOCUMENTS

2007/0058331 A1*  3/2007  Schwager ............... G06F 1/162
                                                361/679.27
2013/0038996 A1*  2/2013  Griffin .................... G06F 1/162
                                                361/679.08

* cited by examiner

*Primary Examiner* — Jerry Wu
(74) *Attorney, Agent, or Firm* — Cheng-Ju Chiang

(57) ABSTRACT

A rotation device includes a fixing element, a friction element fastened to the fixing element, a rotation element and a plurality of friction pieces. The fixing element has a first positioning portion. The rotation element is clamped between the fixing element and the friction element, and is capable of rotating with respect to the fixing element and the friction element. The rotation element has a second positioning portion. When the first positioning portion is engaged with the second positioning portion, an angle positioning function is capable of being provided. The plurality of friction pieces include at least one upper friction piece and at least one lower friction piece. The at least one upper friction piece is located between and contacts with the friction element and the rotation element. The at least one lower friction piece is located between and contacts with the rotation element and the fixing element.

11 Claims, 6 Drawing Sheets

ROTATION DEVICE

BACKGROUND OF THE INVENTION

1. Field of the Invention

The present invention generally relates to a rotation device, and more particularly to a rotation device having an angle positioning function.

2. The Related Art

With the progress of optical sciences and technologies, and semiconductor technologies, liquid crystal display screens are widely used in display devices of electronic products. Because the liquid crystal display screens have advantages of high definitions, small volumes, light weights, being driven at low voltages, low consumed power, extensive application ranges and so on, the liquid crystal display screens have been widely used in computer products or consumer electronic products including notebook computers, desktop displayers and so on, and the liquid crystal display screens have become mainstream display screens.

In general, the liquid crystal display screen of the notebook computer is fastened to an upper cover of the notebook computer. The notebook computer includes a rotation device and a computer host. The rotation device includes a rotation shaft. The upper cover is connected with the computer host of the notebook computer. When the notebook computer is used, the upper cover and the computer host of the notebook computer are opened to expose the liquid crystal display screen fastened to the upper cover. The upper cover is connected with the computer host of the notebook computer by virtue of the rotation shaft of the rotation device, so rotation angles of the upper cover are capable of being modulated according to different angles of the liquid crystal display screen needed by a user of the liquid crystal display screen. Correspondingly, the liquid crystal display screen of the notebook computer has a horizontal rotation function.

However, after the liquid crystal display screen is rotated, the liquid crystal display screen generates a shaking phenomenon that causes an instability of the liquid crystal display screen in use.

In view of the above-mentioned shaking phenomenon, after the liquid crystal display screen is rotated, how to make the different angles of the liquid crystal display screen fixed effectively has become a problem, in order to ensure that the different angles of the liquid crystal display screen are fixed effectively and ensure a stability of the liquid crystal display screen, an innovative rotation device having an angle positioning function is wished to be provided by a designing and manufacturing company of the liquid crystal display screen, and a user of the liquid crystal display screen, so that a stable input and display environment is provided for the user of the liquid crystal display screen.

SUMMARY OF THE INVENTION

An object of the present invention is to provide a rotation device having an angle positioning function and applied in being connected between a screen and a computer host of a notebook computer. The rotation device includes a fixing element, a friction element fastened to the fixing element, a rotation element and a plurality of friction pieces. The fixing element is locked to the computer host, and has a first positioning portion. The rotation element is connected with the screen. The rotation element is clamped between the fixing element and the friction element, and is capable of rotating with respect to the fixing element and the friction element. The rotation element has a second positioning portion matched with the first positioning portion. When the first positioning portion is engaged with the second positioning portion, the angle positioning function is capable of being provided. The plurality of friction pieces include at least one upper friction piece and at least one lower friction piece. The at least one upper friction piece is located between and contacts with the friction element and the rotation element. The at least one lower friction piece is located between and contacts with the rotation element and the fixing element.

As described above, the fixing element is locked to the computer host, the friction element is fastened to the fixing element, the rotation element is connected with the screen which is the liquid crystal display screen, and the rotation element is clamped between the fixing element and the friction element, the rotation element is capable of rotating with respect to the fixing element and the friction element, when the first positioning portion is engaged with the second positioning portion, the angle positioning function of the rotation device is capable of being provided, so that the liquid crystal display screen with different view angles is capable of being provided. Thus, after the liquid crystal display screen is rotated, different angles of the liquid crystal display screen are fixed effectively for ensuring a stability of the liquid crystal display screen in use, so that a stable input and display environment is provided for a user of the liquid crystal display screen.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
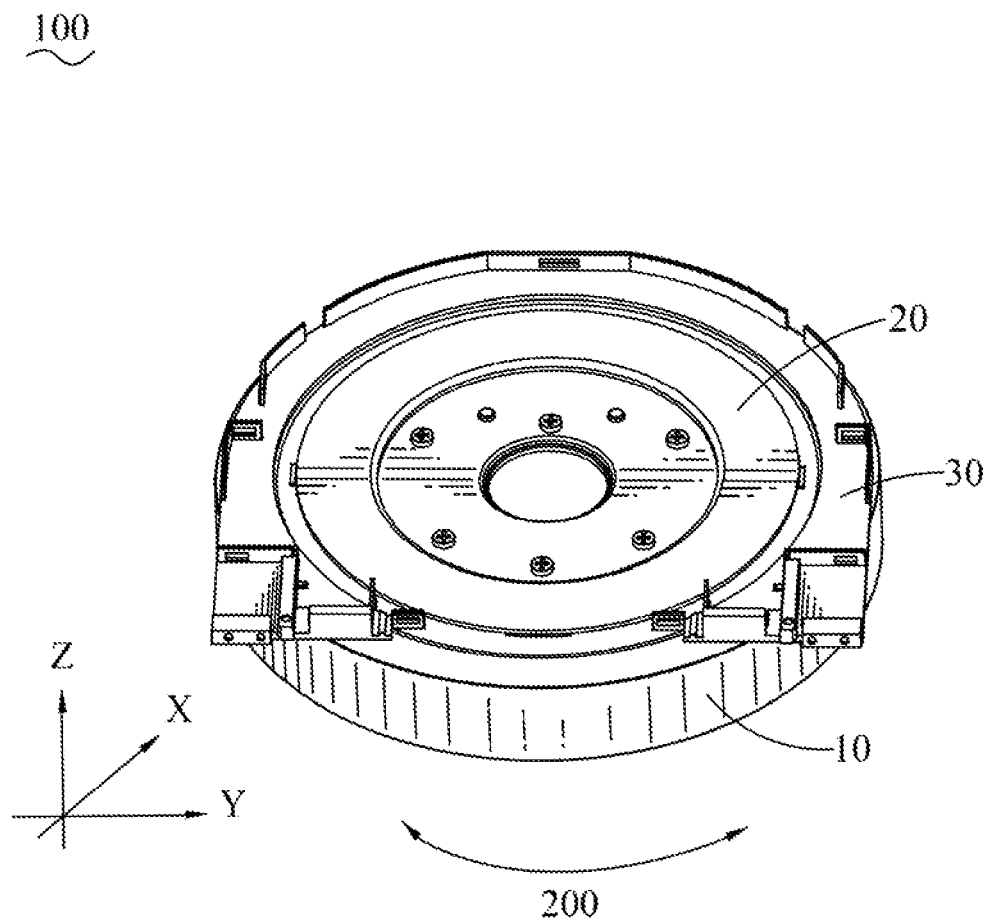
FIG. 1 is a perspective view of a rotation device in accordance with a preferred embodiment of the present invention.

With reference to FIG. 1 to FIG. 5, a rotation device 100 in accordance with a preferred embodiment of the present invention is shown. The rotation device 100 has an angle positioning function. The rotation device 100 is applied in being connected between a screen (not shown) and a computer host (not shown) of a notebook computer (not shown). In this preferred embodiment, the screen is a liquid crystal display screen. The rotation device 100 includes a fixing element 10, a friction element 20, a rotation element 30 and a plurality of friction pieces 40. The rotation device 100 in accordance with the preferred embodiment of the present invention has a 180-degree rotation function. A rotation direction 200 of the rotation device 100 is a rotation direction around a Z axis. The 180-degree rotation function of the rotation device 100 is applied to the notebook computer to make the liquid crystal display screen rotate to different angles, so that the liquid crystal display screen with different view angles is capable of being provided.

The fixing element 10 has a first positioning portion 11. In this preferred embodiment, the first positioning portion 11 is a sliding groove. The fixing element 10 is a disk-shaped base. A middle of a top surface of the fixing element 10 is recessed inward to form a circular receiving space 13. The middle of the top surface of the fixing element 10 is recessed inward to form a ring-shaped holding groove 12 around the receiving space 13. The holding groove 12 is isolated from the receiving space 13 by a peripheral wall of the receiving space 13. The peripheral wall of the receiving space 13 is defined as a peripheral rib 14. A top surface of a bottom wall of the holding groove 12 is recessed inward to form the sliding groove. The sliding groove is of a semi-annular shape and is defined as the first positioning portion 11. The peripheral rib 14 is half surrounded by the sliding groove. At least one portion of the top surface of the bottom wall of the holding groove 12 is recessed inward to form at least one first receiving groove 121. A top surface of a bottom wall of the at least one first receiving groove 121 protrudes in a direction substantially perpendicular to the top surface of the bottom wall of the at least one first receiving groove 121 to form a locating portion 123 projecting into the at least one first receiving groove 121.

In this preferred embodiment, four portions of the top surface of the bottom wall of the holding groove 12 are recessed inward to form four first receiving grooves 121 arranged at intervals. The four first receiving grooves 121 are around and spaced from the peripheral rib 14. Top surfaces of bottom walls of the four first receiving grooves 121 protrude perpendicular to the top surfaces of the bottom walls of the four first receiving grooves 121 to form four locating portions 123 projecting into the four first receiving grooves 121 separately. The first positioning portion 11 is located at an interval 122 between the first receiving grooves 121 and the peripheral rib 14. The first positioning portion 11 is capable of providing the different view angles of the liquid crystal display screen, and the view angles of the liquid crystal display screen are ranged from 0 degree to 180 degrees. A top surface of the peripheral rib 14 is recessed inward to form a fixing groove 141.

Figure 2:
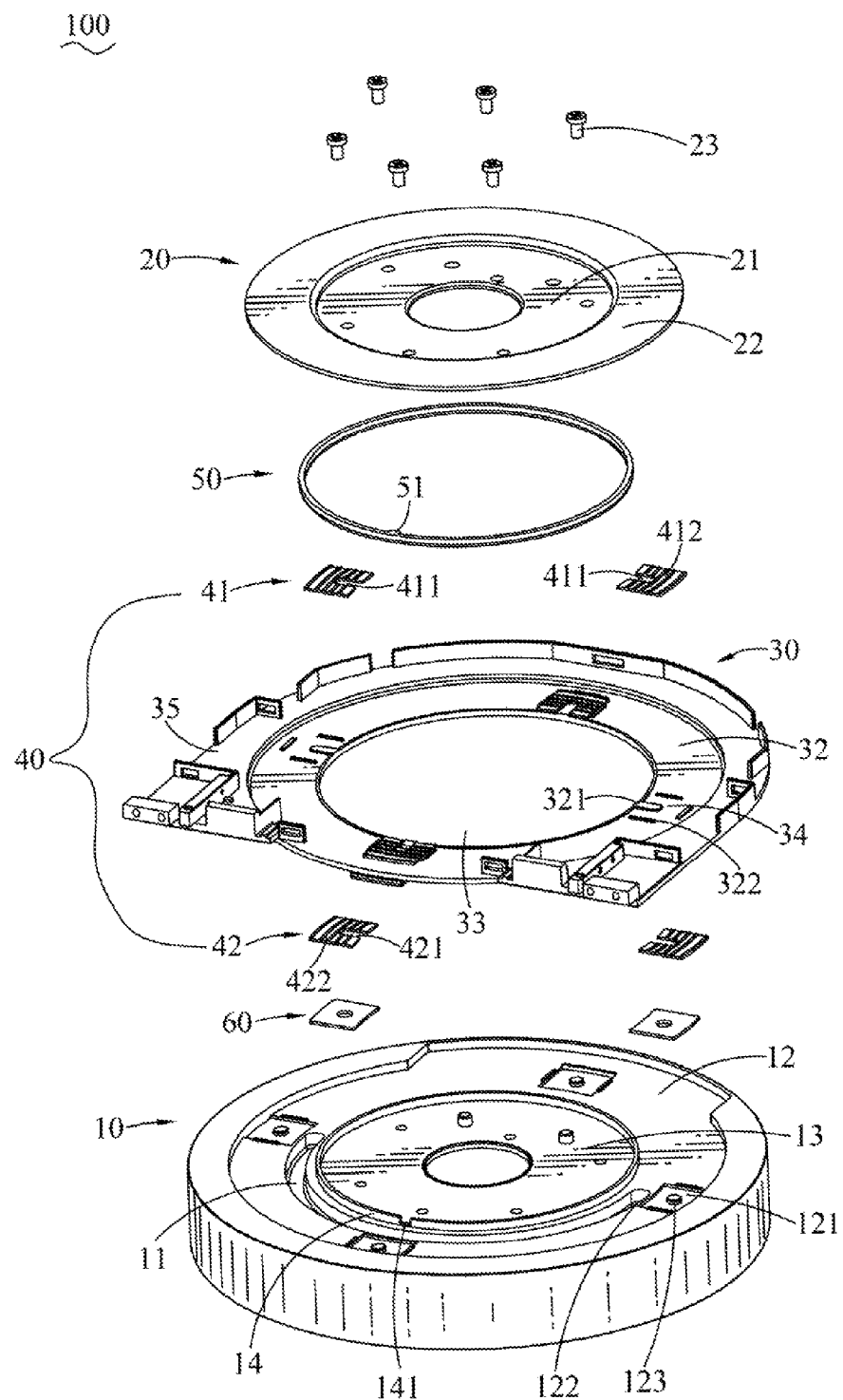
FIG. 2 is an exploded view of the rotation device of FIG. 1.
Figure 3:
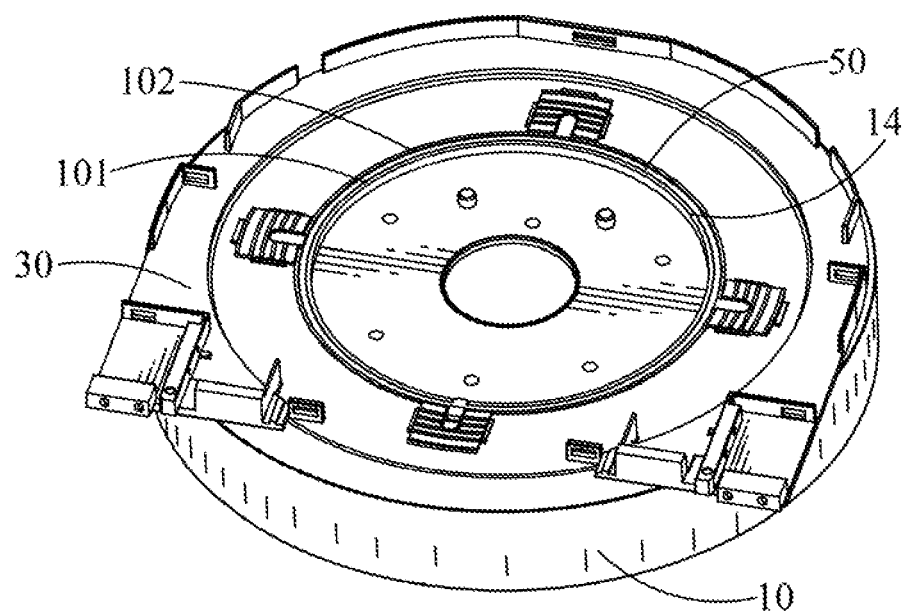
FIG. 3 is a partially perspective view of the rotation device of FIG. 1.

Referring to FIG. 2, the friction element 20 is of a disk shape. The friction element 20 has a ring-shaped base portion 21. A middle of the base portion 21 is sunken. A periphery of the base portion 21 extends outward to form an extending portion 22.

Figure 4:
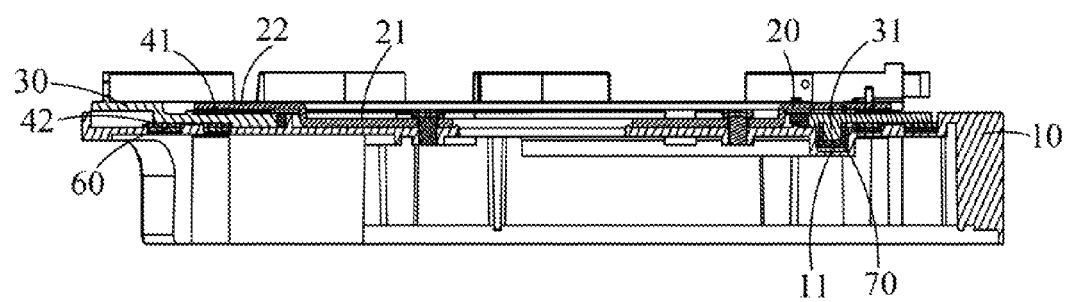
FIG. 4 is a sectional view of the rotation device of FIG. 1.
Figure 5:
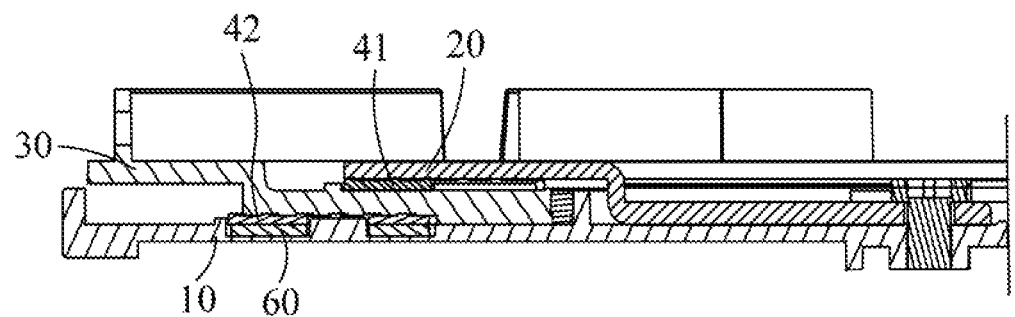
FIG. 5 is a partially sectional view of the rotation device of FIG. 1.
Figure 6:
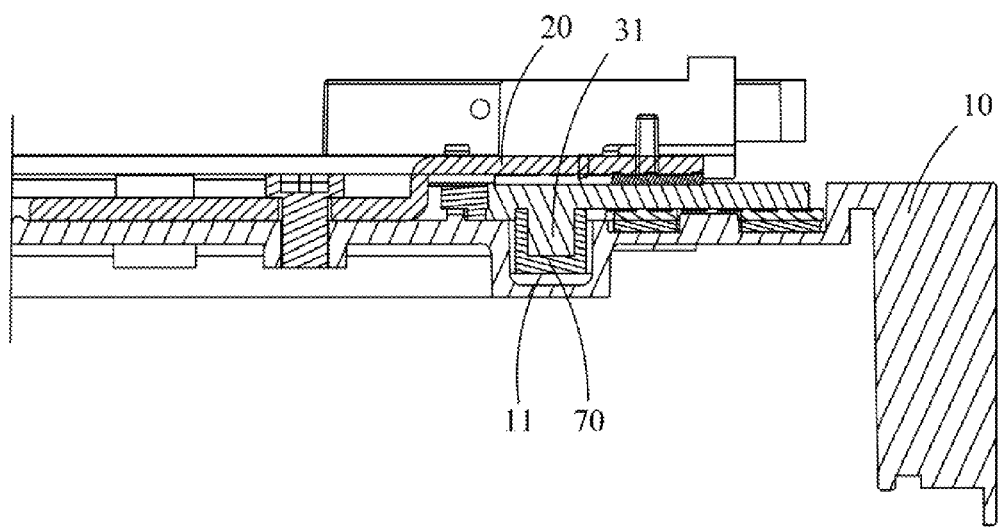
FIG. 6 is another partially sectional view of the rotation device of FIG. 1.

Referring to FIG. 2 and FIG. 4, the rotation element 30 has a second positioning portion 31 matched with the first positioning portion 11. In this preferred embodiment, the second positioning portion 31 is a stopping pillar. A center of the semi-annular sliding groove is defined as a rotation center of the rotation element 30.

The rotation element 30 has a ring-shaped base ring 32, and a connecting portion 35 connected with an outer periphery of the base ring 32. A bottom surface of the base ring 32 protrudes in a direction substantially perpendicular to the bottom surface of the base ring 32 to form the stopping pillar. A middle of the base ring 32 opens an avoiding groove 33 penetrating through the middle of the base ring 32 in a vertical direction. At least one portion of a top surface of the base ring 32 protrudes upward to form at least one protruding portion 321. At least several portions of the top surface of the base ring 32 protrude upward to form at least several bars 322. The at least several bars 322 are distributed around and spaced from the at least one protruding portion 321 to form at least one second receiving groove 34. In this preferred embodiment, four portions of the top surface of the base ring 32 protrude upward to form four protruding portions 321 uniformly distributed on the top surface of the base ring 32 and around the avoiding groove 33. Multiple portions of the top surface of the base ring 32 protrude upward to form four groups of the bars 322. The rotation element 30 defines four second receiving grooves 34. Each group of the bars 322 are distributed around and spaced from one of the four protruding portions 321 to form one of the four second receiving grooves 34.

Referring to FIG. 2, the plurality of the friction pieces 40 include at least one upper friction piece 41 and at least one lower friction piece 42. The at least one lower friction piece 42 defines a first locating groove 421. The at least one upper friction piece 41 defines a second locating groove 411. In this preferred embodiment, the plurality of the friction pieces 40 include four upper friction pieces 41 and four lower friction pieces 42. Each of the four lower friction pieces 42 defines the first locating groove 421. Each of the four upper friction pieces 41 defines the second locating groove 411.

Referring to FIG. 2 again, the rotation device 100 further includes a friction ring 50 and at least one soft gasket 60. In this preferred embodiment, the rotation device 100 includes four soft gaskets 60. An inner surface of the friction ring 50 protrudes inward to form a fixing block 51.

Referring to FIG. 1 to FIG. 6, when the rotation device 100 is assembled, the fixing element 10 is locked to the computer host, and has the first positioning portion 11. The friction element 20 is fastened to the fixing element 10. The friction element 20 is fastened in the receiving space 13 of the fixing element 10 by virtue of screws 23. An upper portion of the friction element 20 is located above and spaced from the top surface of the peripheral rib 14. An outer surface of a lower portion of the friction element 20 is spaced from an inner surface of the peripheral rib 14. The base portion 21 of the friction element 20 is fastened in and received in the receiving space 13. The extending portion 22 is disposed to the holding groove 12. The extending portion 22 is located above and spaced from the top surface of the peripheral rib 14. An outer surface of the extending portion 22 is spaced from the inner surface of the peripheral rib 14. The friction ring 50 is worn around the peripheral rib 14. The fixing block 51 is fixed in the fixing groove 141.

The rotation element 30 is connected with the screen. The rotation element 30 is received between the fixing element 10 and the friction element 20. So the rotation element 30 is clamped between the fixing element 10 and the friction element 20, and is capable of rotating with respect to the fixing element 10 and the friction element 20. The first positioning portion 11 is engaged with the second positioning portion 31. The stopping pillar is engaged with the sliding groove and is capable of sliding in the sliding groove. The base ring 32 surrounds the friction ring 50 together with the peripheral rib 14. The base ring 32 is disposed in the holding groove 12, and the base ring 32 is located between the extending portion 22 and the bottom wall of the holding groove 12. The connecting portion 35 is disposed to the top surface of the fixing element 10. The peripheral rib 14 and the friction ring 50 are received in the avoiding groove 33. A first clearance 101 is defined between the peripheral rib 14 and the friction ring 50 along a horizontal direction perpendicular to the vertical direction. A second clearance 102 is defined between the friction ring 50 and an inner surface of a peripheral wall of the avoiding groove 33 along the horizontal direction perpendicular to the vertical direction. Lubricating oil is disposed in the second clearance 102 properly. The first clearance 101 and the second clearance 102 are designed properly.

The friction ring 50 is disposed between a bottom surface of the extending portion 22 of the friction element 20 and the top surface of the bottom wall of the holding groove 12. The bottom surface of the extending portion 22 of the friction element 20 is capable of rubbing against the friction ring 50 for preventing a slippage of the rotation device 100. The at least one upper friction piece 41 is located between and contacts with the friction element 20 and the rotation element 30. The at least one lower friction piece 42 is located between and contacts with the rotation element 30 and the fixing element 10. The at least one lower friction piece 42 is placed in the at least one first receiving groove 121. The locating portion 123 is located in the first locating groove 421 of the at least one lower friction piece 42. The at least one upper friction piece 41 is placed in the at least one second receiving groove 34. The at least one upper friction piece 41 is adhered to the at least one second receiving groove 34. The at least one protruding portion 321 is located in the second locating groove 411 of the at least one upper friction piece 41.

The four lower friction pieces 42 are placed in the four first receiving grooves 121. The four locating portions 123 are located in the first locating grooves 421 of the four lower friction pieces 42. The four upper friction pieces 41 are placed in the four second receiving grooves 34. The four upper friction pieces 41 are adhered to the four second receiving grooves 34. The four protruding portions 321 are located in the second locating grooves 411 of the four upper friction pieces 41. The at least one soft gasket 60 is received between the at least one lower friction piece 42 and a bottom wall of the at least one first receiving groove 121. Each of the four soft gaskets 60 is received between one of the four lower friction pieces 42 and the bottom wall of one of the four first receiving grooves 121.

When the rotation element 30 is rotated, a hardness of the at least one soft gasket 60 will affect a torsion force of the rotation element 30. When the at least one soft gasket 60 is harder, the torsion force of the rotation element 30 is larger. When the at least one soft gasket 60 is softer, the torsion force of the rotation element 30 is smaller. The at least one soft gasket 60 having a proper hardness is capable of being chosen according to different needs. In addition, when the fixing element 10, the friction element 20 and the rotation element 30 are used in a rotation, a deformation amount is existed in a flatness of the fixing element 10, the friction element 20 and the rotation element 30. When an external force makes the rotation element 30 rotate, the at least one soft gasket 60 is capable of decreasing the deformation amount, so that the rotation element 30 is capable of rotating smoothly, and the deformation amount of the fixing element 10, the friction element 20 and the rotation element 30 is lowered.

A top surface of the at least one lower friction piece 42 faces and contacts with a bottom surface of the rotation element 30. Several portions of the top surface of the at least one lower friction piece 42 are recessed inward to form a plurality of spaced first recesses 422. The top surface of the at least one lower friction piece 42 is coated with the lubricating oil, and the lubricating oil is received in the first recesses 422. A top surface of the at least one upper friction piece 41 faces and contacts with a bottom surface of the friction element 20. Several portions of the top surface of the at least one upper friction piece 41 are recessed inward to form a plurality of spaced second recesses 412. The top surface of the at least one upper friction piece 41 is coated with the lubricating oil, and the lubricating oil is received in the second recesses 412.

A top surface of each of the four lower friction pieces 42 faces and contacts with the bottom surface of the rotation element 30. Several portions of the top surface of each of the four lower friction pieces 42 are recessed inward to form the plurality of the spaced first recesses 422. The top surface of each of the four lower friction pieces 42 is coated with the lubricating oil, and the lubricating oil is received in the plurality of the first recesses 422. A top surface of each of the four upper friction pieces 41 faces and contacts with the bottom surface of the friction element 20. Several portions of the top surface of each of the four upper friction pieces 41 are recessed inward to form the plurality of the spaced second recesses 412. The top surface of each of the four upper friction pieces 41 is coated with the lubricating oil, and the lubricating oil is received in the plurality of the second recesses 412.

When the first positioning portion 11 is engaged with the second positioning portion 31, namely, when the stopping pillar is engaged with the sliding groove, the angle positioning function of the rotation device 100 is capable of being provided. The stopping pillar is slidably disposed in the sliding groove. The stopping pillar is capable of sliding in the sliding groove to make the rotation element 30 together with the liquid crystal display screen rotate to the different angles ranged from 0 degree to 180 degrees, so that the liquid crystal display screen with the different view angles is capable of being provided. Specifically, the stopping pillar slides between two inner walls of two free ends of the sliding groove for limiting rotation angles of the rotation element 30, so that the rotation element 30 is prevented from being rotated overly. When the rotation element 30 is rotated, the stopping pillar slides in the sliding groove until the stopping pillar abuts against an inner wall of each free end of the sliding groove. In this preferred embodiment, the rotation angles of the rotation element 30 are ranged from 0 degree to 180 degrees.

The rotation device 100 further includes a soft blocking sleeve 70. The soft blocking sleeve 70 is capable of being worn around the stopping pillar, and the stopping pillar and the soft blocking sleeve 70 are capable of sliding in the sliding groove to make the rotation element 30 together with the liquid crystal display screen rotate to the different angles ranged from 0 degree to 180 degrees, so that the liquid crystal display screen with the different view angles is capable of being provided. When the stopping pillar and the soft blocking sleeve 70 slide in the sliding groove, the soft blocking sleeve 70 is worn around the stopping pillar for buffering a force and lowering a hitting sound between the stopping pillar together with the soft blocking sleeve 70 and a wall of the sliding groove when the stopping pillar and the soft blocking sleeve 70 hit against the wall of the sliding groove.

As described above, the fixing element 10 is locked to the computer host, the friction element 20 is fastened to the fixing element 10, the rotation element 30 is connected with the screen which is the liquid crystal display screen, and the rotation element 30 is clamped between the fixing element 10 and the friction element 20, the rotation element 30 is capable of rotating with respect to the fixing element 10 and the friction element 20, when the first positioning portion 11 is engaged with the second positioning portion 31, the angle positioning function of the rotation device 100 is capable of being provided, so that the liquid crystal display screen with the different view angles is capable of being provided. Thus, after the liquid crystal display screen is rotated, the different angles of the liquid crystal display screen are fixed effectively for ensuring a stability of the liquid crystal display screen in use, so that a stable input and display environment is provided for a user of the liquid crystal display screen.

What is claimed is:

1. A rotation device having an angle positioning function and applied in being connected between a screen and a computer host of a notebook computer, the rotation device comprising: a fixing element locked to the computer host, and having a first positioning portion; a friction element fastened to the fixing element; a rotation element connected with the screen, the rotation element being clamped between the fixing element and the friction element, and being capable of rotating together with the screen with respect to the fixing element and the friction element, the rotation element having a second positioning portion matched with the first positioning portion, when the first positioning portion is engaged with the second positioning portion, the angle positioning function being capable of being provided; and a plurality of friction pieces including at least one upper friction piece and at least one lower friction piece, the at least one upper friction piece being located between and contacting with the friction element and the rotation element, the at least one lower friction piece being located between and contacting with the rotation element and the fixing element.

2. The rotation device as claimed in claim 1, wherein the first positioning portion is a sliding groove, the second positioning portion is a stopping pillar, the stopping pillar is engaged with the sliding groove and is capable of sliding in the sliding groove.

3. The rotation device as claimed in claim 1, wherein the fixing element is a disk-shaped base, a middle of a top surface of the fixing element is recessed inward to form a circular receiving space, the friction element has a ring-shaped base portion, a middle of the base portion is sunken, the base portion is fastened in and received in the receiving space.

4. The rotation device as claimed in claim 3, wherein the middle of the top surface of the fixing element is recessed inward to form a ring-shaped holding groove around the receiving space, the holding groove is isolated from the receiving space by a peripheral wall of the receiving space which is defined as a peripheral rib, a periphery of the base portion extends outward to form an extending portion, the extending portion is disposed to the holding groove, the extending portion is located above and spaced from a top surface of the peripheral rib.

5. The rotation device as claimed in claim 4, wherein a top surface of a bottom wall of the holding groove is recessed inward to form a sliding groove which is of a semi-annular shape, the peripheral rib is half surrounded by the sliding groove, the rotation element has a ring-shaped base ring, the base ring is disposed in the holding groove, and the base ring is located between the extending portion and the bottom wall of the holding groove, a bottom surface of the base ring protrudes in a direction substantially perpendicular to the bottom surface of the base ring to form a stopping pillar, the stopping pillar is engaged with the sliding groove and is capable of sliding in the sliding groove.

6. The rotation device as claimed in claim 5, wherein the sliding groove is of a semi-annular shape, the stopping pillar slides between two inner walls of two free ends of the sliding groove for limiting rotation angles of the rotation element, the rotation angles of the rotation element are ranged from 0 degree to 180 degrees.

7. The rotation device as claimed in claim 5, further comprising a friction ring, the friction ring being worn around the peripheral rib, a middle of the base ring opening an avoiding groove penetrating through the middle of the base ring in a vertical direction, the base ring surrounding the friction ring together with the peripheral rib, the peripheral rib and the friction ring being received in the avoiding groove.

8. The rotation device as claimed in claim 7, wherein an inner surface of the friction ring protrudes inward to form a fixing block, a top surface of the peripheral rib is recessed inward to form a fixing groove, the fixing block is fixed in the fixing groove.

9. The rotation device as claimed in claim 5, wherein at least one portion of the top surface of the bottom wall of the holding groove is recessed inward to form at least one first receiving groove, at least one portion of a top surface of the base ring protrudes upward to form at least one protruding portion, at least several portions of the top surface of the base ring protrude upward to form at least several bars, the at least several bars are distributed around and spaced from the at least one protruding portion to form at least one second receiving groove, the at least one lower friction piece is placed in the at least one first receiving groove, the at least one upper friction piece is placed in the at least one second receiving groove.

10. The rotation device as claimed in claim 9, further comprising at least one soft gasket, the at least one soft gasket being received between the at least one lower friction piece and a bottom wall of the at least one first receiving groove.

11. The rotation device as claimed in claim 5, further comprising a soft blocking sleeve, the soft blocking sleeve being worn around the stopping pillar for buffering a force and lowering a hitting sound between the stopping pillar together with the soft blocking sleeve and a wall of the sliding groove when the stopping pillar and the soft blocking sleeve hit against the wall of the sliding groove.

* * * * *